United States Patent
Bauer et al.

[11] Patent Number: 5,808,778
[45] Date of Patent: Sep. 15, 1998

[54] ELECTRO-OPTIC REARVIEW MIRROR FOR AUTOMOTIVE VEHICLES

[75] Inventors: Frederick T. Bauer; Harlan J. Byker, both of Holland; David J. Cammenga, Zeeland; John K. Roberts, East Grand Rapids, all of Mich.

[73] Assignee: Gentex Corporation, Zeeland, Mich.

[21] Appl. No.: 729,569

[22] Filed: Oct. 11, 1996

Related U.S. Application Data

[60] Provisional application No. 60/005,726, Oct. 25, 1995.

[51] Int. Cl.$^6$ .............................. G02F 1/15; G02F 1/153
[52] U.S. Cl. ........................................... 359/267; 359/265
[58] Field of Search ................................ 359/630, 265, 359/267, 272, 275, 634

[56] References Cited

U.S. PATENT DOCUMENTS

| | | | |
|---|---|---|---|
| 3,844,636 | 10/1974 | Maricle et al. | 359/267 |
| 4,902,108 | 2/1990 | Byker | 359/265 |
| 4,917,477 | 4/1990 | Bechtel et al. | 359/267 |
| 5,073,012 | 12/1991 | Lynam | 359/265 |
| 5,076,674 | 12/1991 | Lynam | 359/274 |
| 5,128,799 | 7/1992 | Byker | 359/265 |
| 5,202,787 | 4/1993 | Byker et al. | 359/267 |
| 5,280,380 | 1/1994 | Byker | 359/265 |
| 5,282,077 | 1/1994 | Byker | 359/272 |
| 5,355,245 | 10/1994 | Lynam | 359/267 |
| 5,481,395 | 1/1996 | Byker | 359/272 |
| 5,488,397 | 1/1996 | Tonar | 359/272 |
| 5,521,744 | 5/1996 | Mazurek | 359/267 |
| 5,550,677 | 8/1996 | Schofield et al. | 359/604 |
| 5,581,406 | 12/1996 | Kobayashi et al. | 359/604 |

Primary Examiner—Georgia Y. Epps
Assistant Examiner—Ricky Mack
Attorney, Agent, or Firm—Malcolm R. McKinnon

[57] ABSTRACT

An electro-optic rearview mirror which has improved glare-reducing properties and in which the electro-optic medium in a darkened state has enhanced transmittance of visible light in the generally orange, red and near infrared wavelengths. If desired, the electro-optic rearview mirror embodying the invention may incorporate display means which shines through the electro-optic medium, the peak emission of the display means substantially corresponding with the enhanced transmittance of the electro-optic medium whereby the brightness of the display means is increased.

18 Claims, 11 Drawing Sheets

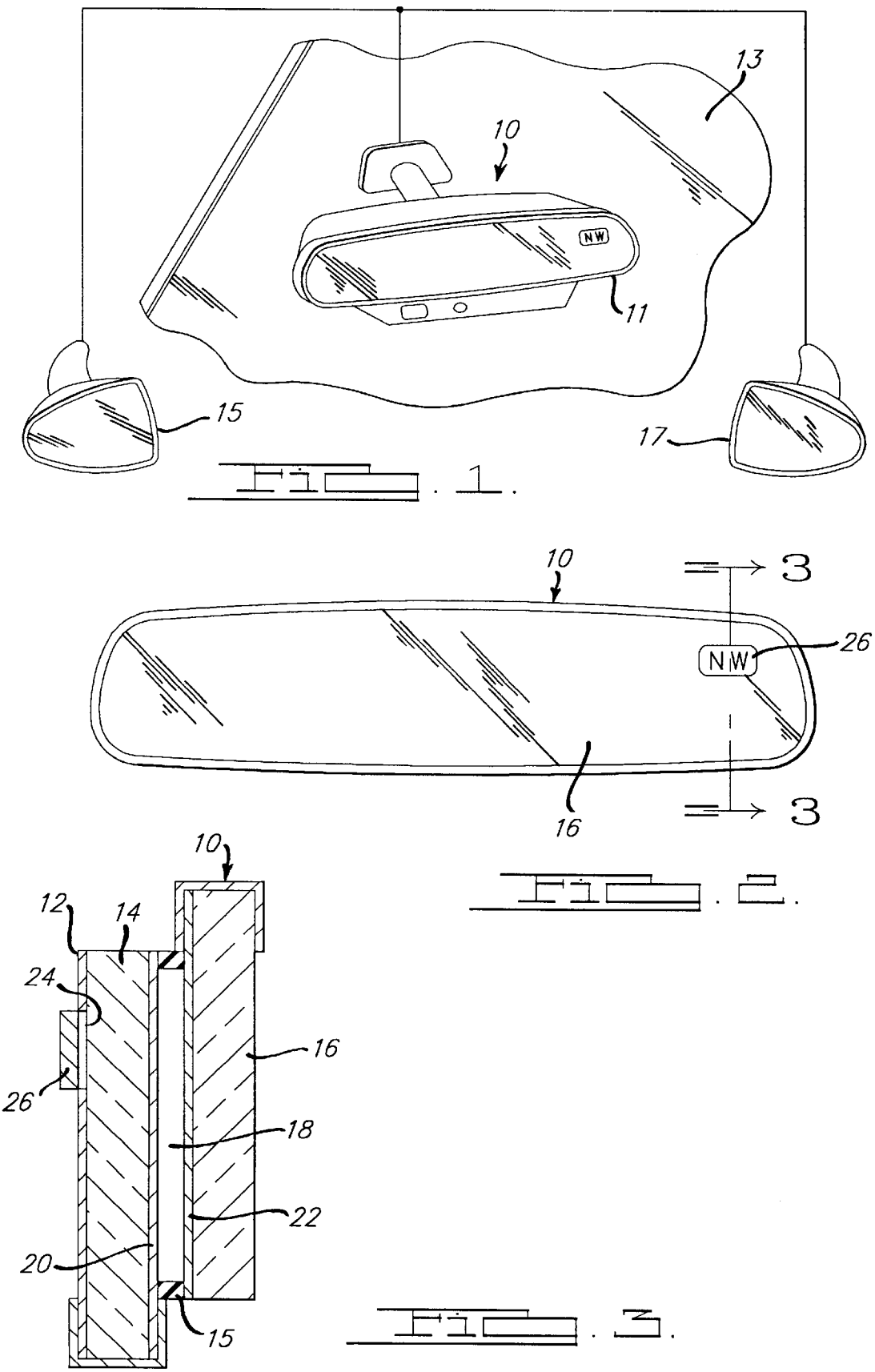

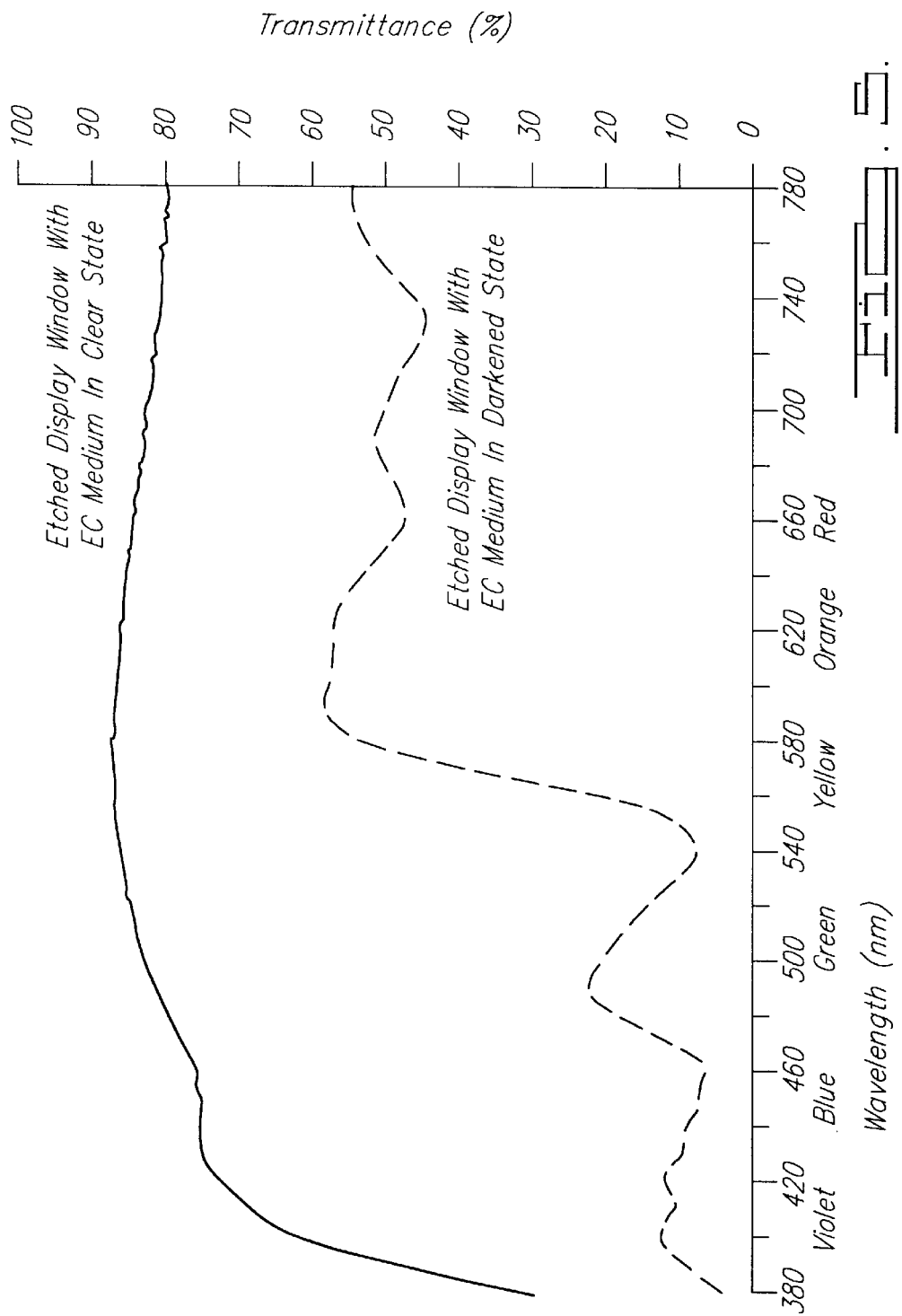

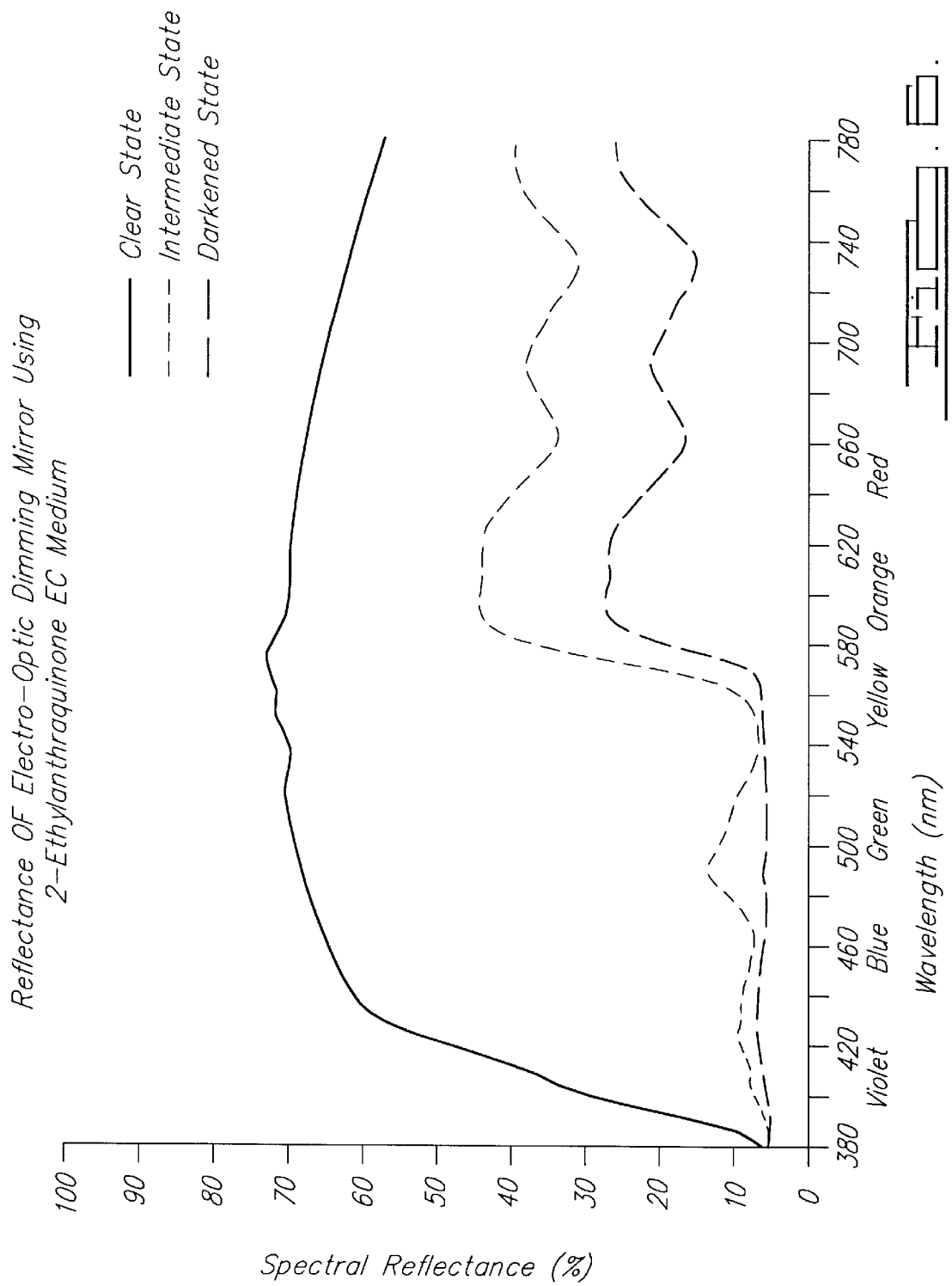

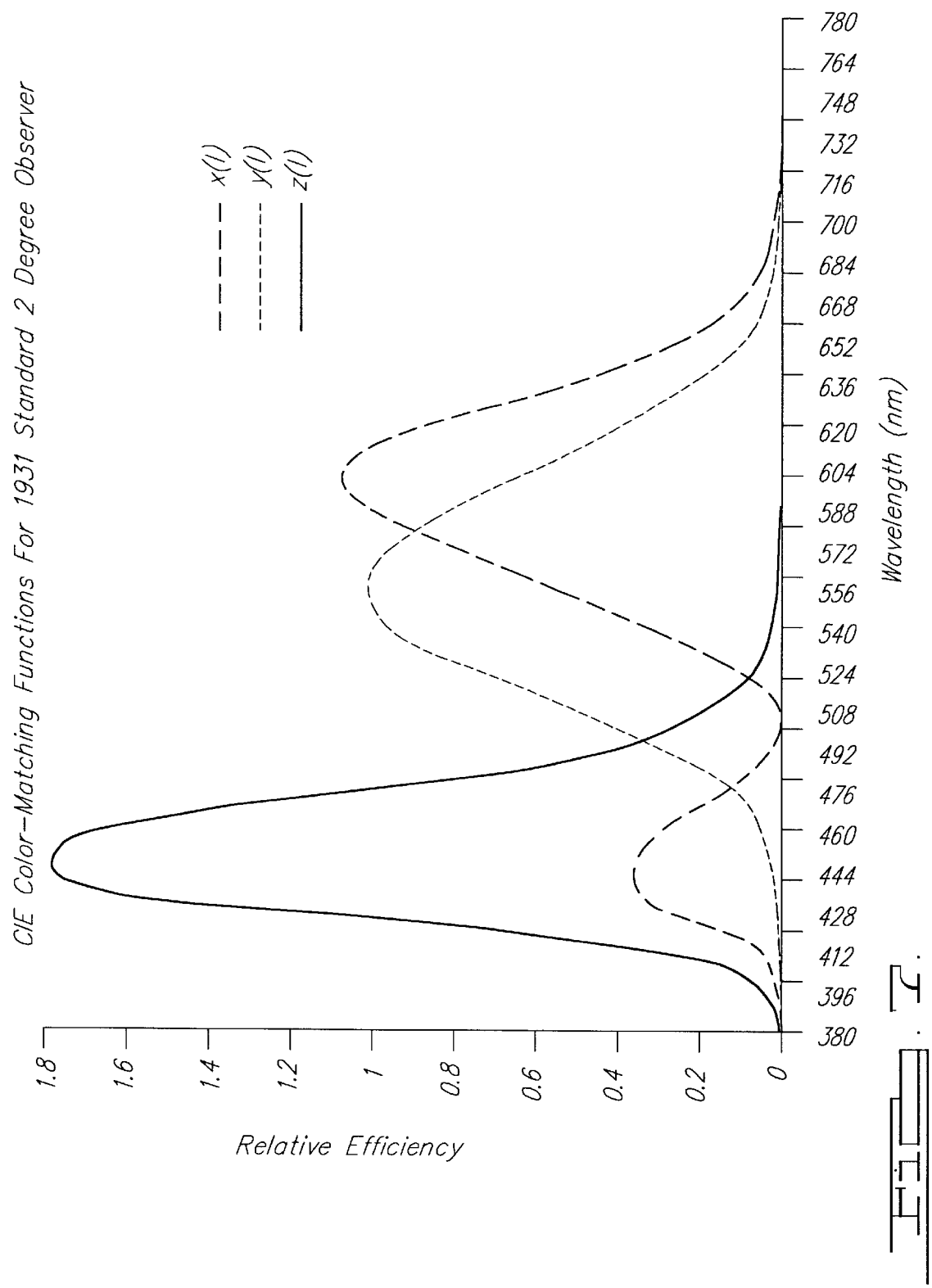

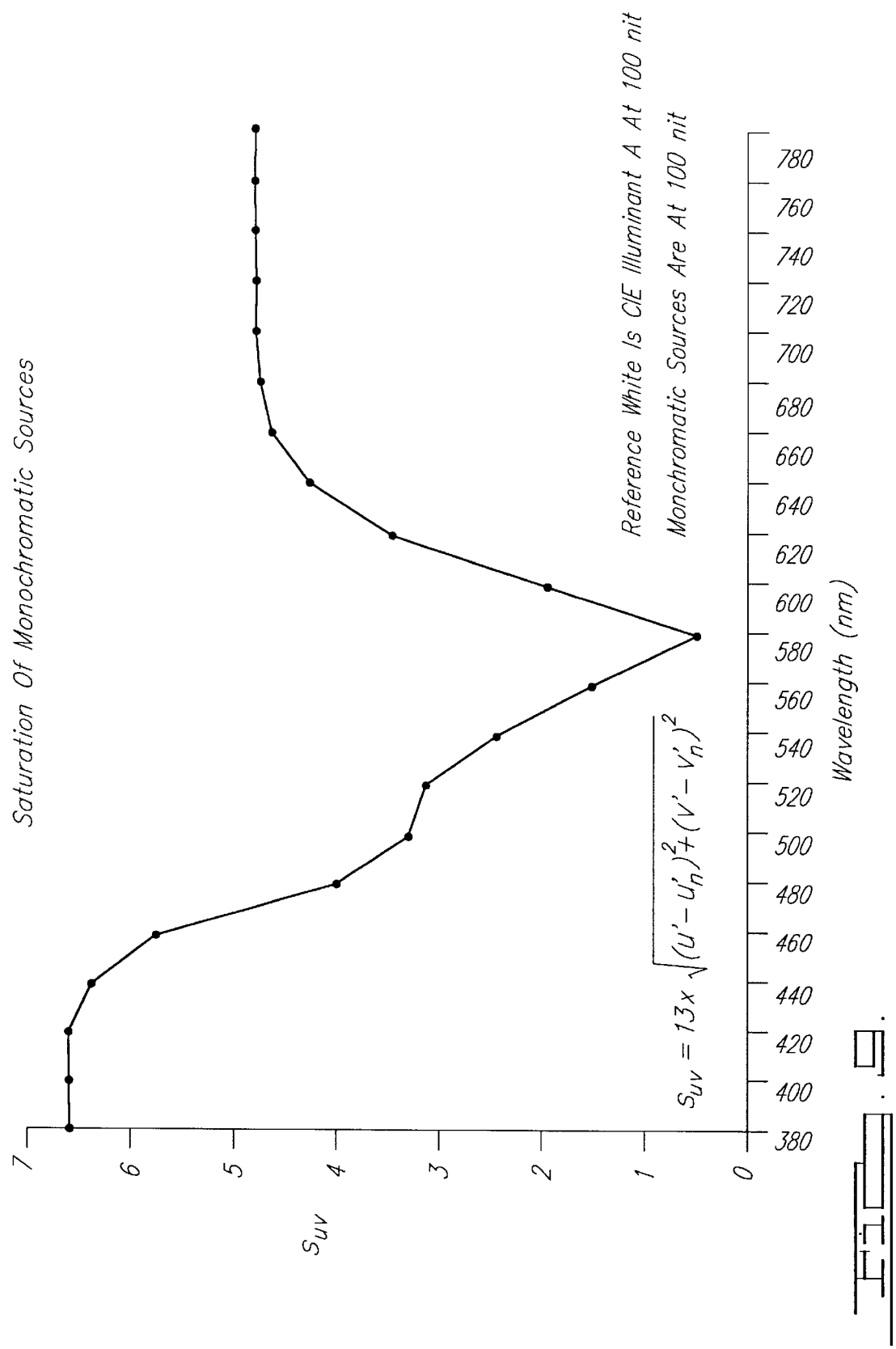

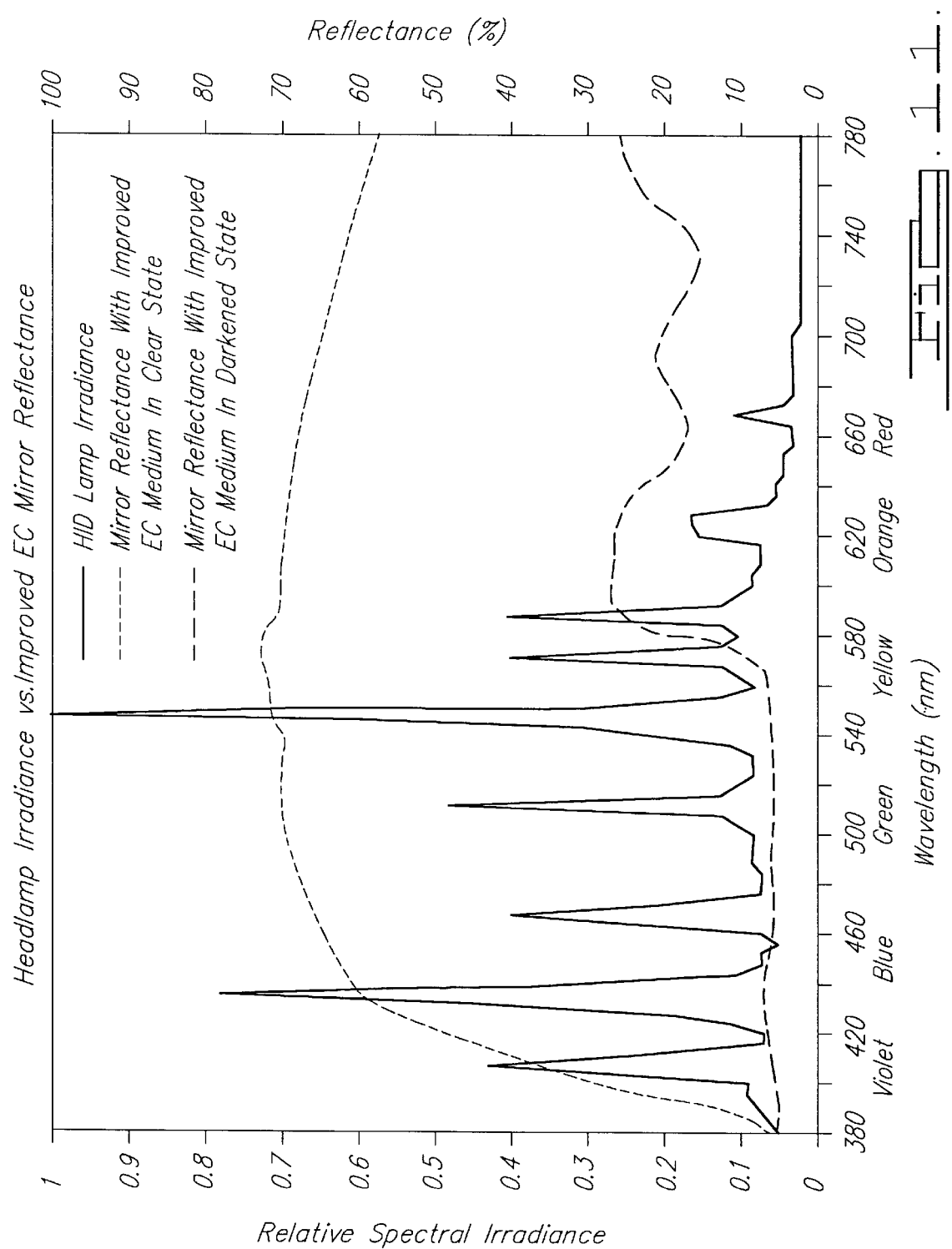

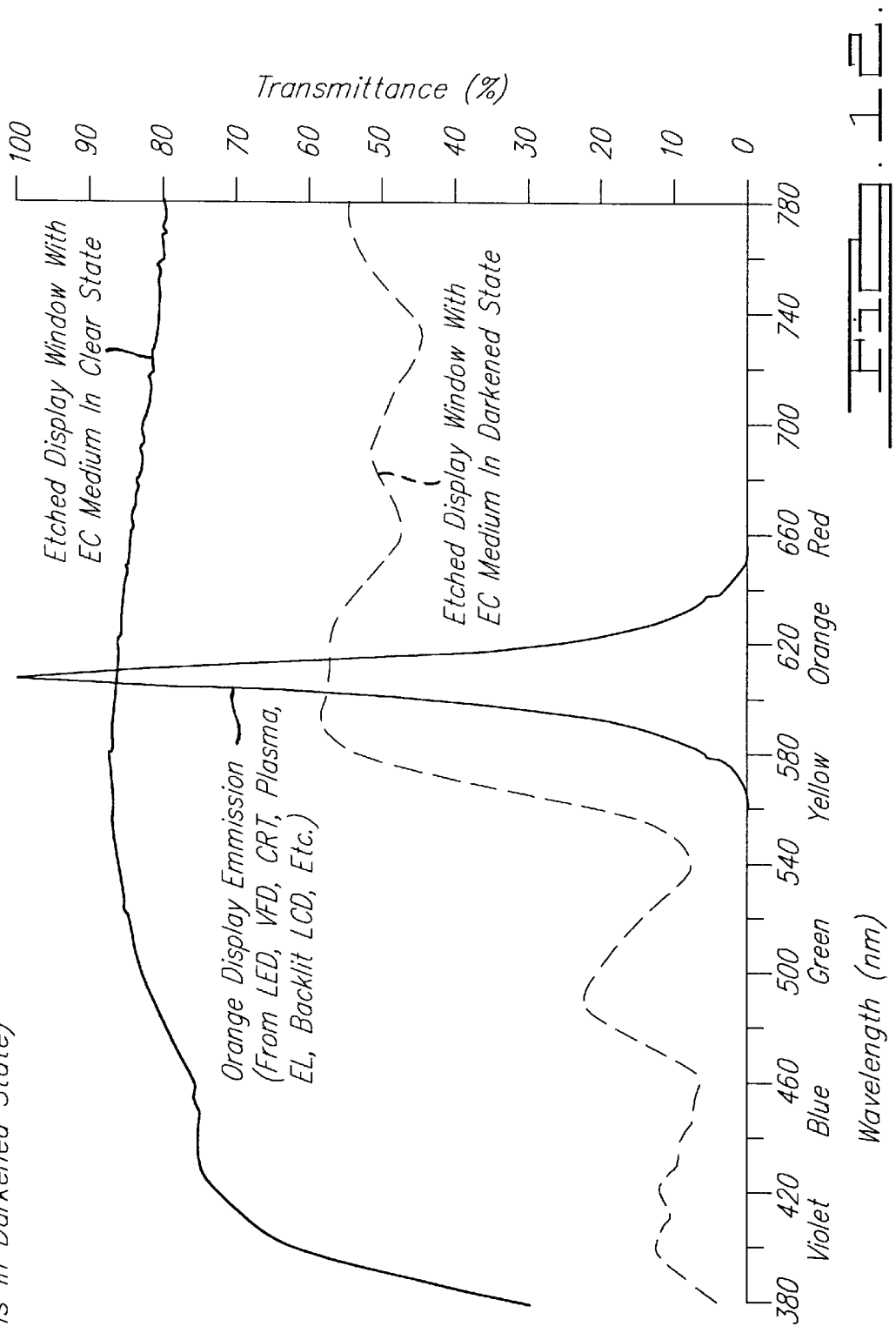

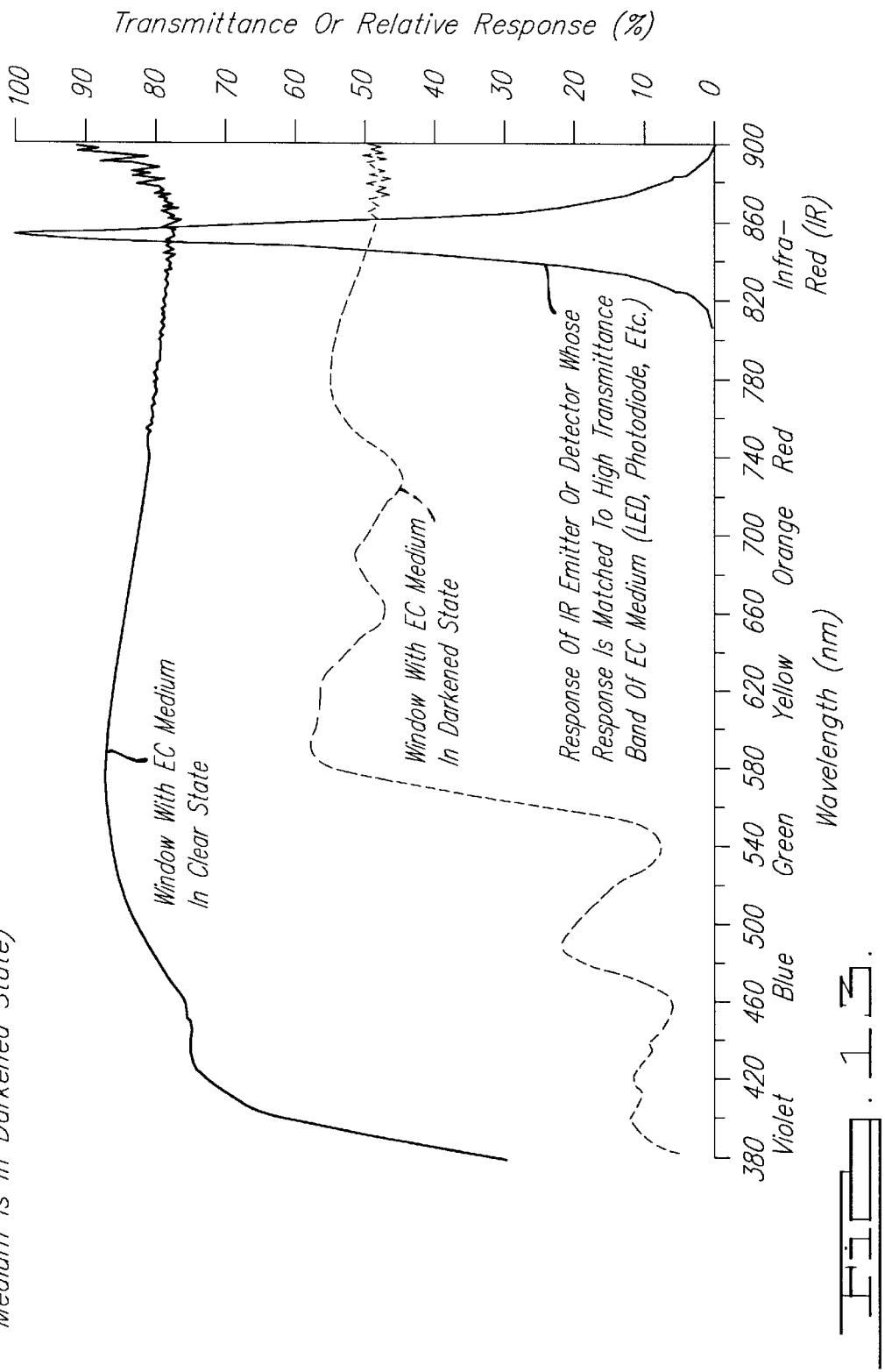

ELECTRO-OPTIC REARVIEW MIRROR FOR AUTOMOTIVE VEHICLES

This application claims the benefit of U.S. Provisional Application No. 60/005,726, filed Oct. 20, 1995.

This invention relates to electro-optic rearview mirrors for automotive vehicles and, more particularly, to an improved electro-optic rearview mirror which is adapted to automatically transfer from a full reflectance mode to the partial reflectance mode for glare protection purposes from light emanating from the headlights of vehicles approaching from the rear and which mirror may also incorporate display means, as for example, display means for indicating outside temperature and/or compass displays indicating the direction of travel of the vehicle.

Heretofore, various electro-optic rearview mirrors for automotive vehicles have been devised which automatically change from a full reflectance mode (day) to a partial reflectance mode (night) for glare protection purposes from light emanating from the headlights of vehicles approaching from the rear. The electrochromic mirrors disclosed in U.S. Pat. No. 4,902,108, issued Feb. 20, 1990, for Single-Compartment, Self-Erasing, Solution-Phase Electrochromic Devices, Solutions for Use Therein, and Uses Thereof; U.S. Pat. No. 4,917,477, issued Apr. 17, 1990, for Automatic Rearview Mirror System for Automotive Vehicles; U.S. Pat. No. 5,128,799, issued Jul. 7, 1992, for Variable Reflectance Motor Vehicle Mirror; U.S. Pat. No. 5,202,787, issued Apr. 13, 1993, for Electro-Optic Device; U.S. Pat. No. 5,280,380, issued Jan. 18, 1994, for UV-Stabilizd Compositions and Methods; and U.S. Pat. No. 5,282,077, issued Jan. 25, 1994, for Variable Reflectance Mirror, each of which patents is assigned to the assignee of the present invention and the disclosures of each of which are hereby incorporated herein by reference, are typical of modern day electro-optic rearview mirrors for automotive vehicles. Such mirrors may be utilized in a filly integrated inside/outside rearview mirror system or as an inside or an outside rearview mirror system. In general, in automatic rearview mirrors of the types disclosed in U.S. Pat. Nos. 4,902,108; 4,917,477; 5,128,799; 5,202,787; 5,280,380 and 5,282,077, both the inside and the outside rearview mirrors are comprised of a relatively thin electro-optic medium sandwiched and sealed between two glass elements. In most cases, when the electro-optic medium is electrically energized, it darkens and begins to absorb light, and the higher the voltage, the darker the mirror becomes. When the electrical voltage is decreased to zero, the mirror returns to its clear state. Also, in general, the electro-optic medium sandwiched and sealed between the two glass elements is preferably comprised of solutions of electrochromic compounds which function as the media of variable transmittance in the mirrors, although it should be understood that other electro-optic media may be utilized. When operated automatically, the rearview mirrors of the indicated character generally incorporate light-sensing electronic circuitry which is effective to change the mirrors to the dimmed reflectance modes when glare is detected, the sandwiched electro-optic medium being activated and the mirror being dimmed in proportion to the amount of glare that is detected. As glare subsides, the mirror automatically returns to its normal reflectance state without any action being required on the part of the driver of the vehicle. The electro-optic medium is disposed in a sealed chamber generally defined by a transparent front glass element, a peripheral edge seal, and a rear mirror element having a reflective layer, the electro-optic medium filling the chamber. Conductive layers are provided on the inside of the front and rear glass elements, the conductive layer on the front glass element being transparent while the conductive layer on the rear glass element may be transparent or the conductive layer on the rear glass element may be semi-transparent or opaque and also have reflective characteristics and function as the reflective layer for the mirror assembly. The conductive layers on both the front glass element and the rear glass element are connected to electronic circuitry which is effective to electrically energize the electro-optic medium to switch the mirror to nighttime, decreased reflectance modes when glare is detected and thereafter allow the mirror to return to the daytime, high reflectance mode when the glare subsides as described in detail in the aforementioned U.S. Patents.

It should be understood that when luminous displays are incorporated within these electro-optic mirrors, a portion of the reflective surface (inside or backside of the second piece of glass) is removed such that the display may shine through the glass and sandwiched electro-optic media and be seen by the vehicle operator.

These automatically-dimming, glare reducing mirrors as disclosed in the prior art have been generally effective, and, in any case, are superior to standard mirrors which do not automatically attenuate glare and are limited to only one or two states of reflectance. Despite this, recent developments and discoveries have created an obvious need for improvements.

For example, new headlamp technologies have been widely adopted for use on motor vehicles to such an extent that the very nature of glare has evolved beyond the optimum capabilities of prior art electro-optic dimming mirrors. High Intensity Discharge (HID) lamps and Halogen IR reflecting lamps have become very popular because of their enhanced efficiency, longevity and brightness. A characteristic side effect of these high color temperature lamps, however, is their unique spectral distribution which tends to be substantially more skewed towards the short wavelength end of the visible spectrum (between 380 and 585 nanometers) and whose colors are perceived to be more violet, blue or blue-green than earlier headlamp systems using standard tungsten filament technology.

This evolutionary shift in headlamp spectra towards the blue end of the visible spectrum poses a new problem for mirrors which are "bluish" in their rendering of reflected images. Such mirrors as those disclosed in U.S. Pat. No. 5,355,245 appear blue because their spectral reflectance is higher in the blue end of the spectrum (below 585 nanometers) than at the red-orange end of the spectrum (above 585 nanometers). This enhanced blue reflectance characteristic is seen to be present in some prior art mirrors on a full time basis and in others only when their electro-optic media is in the darkened state.

Unfortunately, the enhanced or preferential blue reflectance of these assemblies amplifies the glare from recently popularized lamp technologies such as the HID lamp, or at least, is minimally effective in reducing such glare. This effect is worsened by five other factors, all of which conspire to illustrate a need for mirrors having a color other than blue, violet, or blue-green (even if darkened by an electro-optic medium).

1) By virtue of the so-called Helmholtz-Kohlrausch effect, it has long been known that illuminants having greater saturation with respect to the ambient environment exhibit apparent brightness/glare greater than that predicted by their actual luminance.

2) Different colored illuminants having the same luminance exhibit varying degrees of saturation, blue being the highest, deep red being next and amber-orange being lowest.

3) Nighttime vision (scotopic) and very dim vision (mesopic) have long been known by the so-called Purkinje phenomena to be more sensitive to bluish light than to orange light. This increases the luminance and apparent brightness/glare of bluish light in any night or very dim setting where a person's vision is at least partially adapted to low light levels. Responsibility for all or part of this enhanced blue-light sensitivity goes to the photo chemical pigment known as rhodopsin or "visual purple" which is produced in the retina and works to increase the sensitivity of the rod cells.

4) It is also known that rhodopsin production in the eye in sufficient quantities to improve night vision takes time (several minutes); if the rhodopsin is destroyed, night vision suffers until such time as the pigment is replaced. Unfortunately, the very high energy photons associated with violet, blue and blue-green light are notorious for their efficiency at photochemically destroying rhodopsin. (For this reason, the Armed Services exclusively uses red lighting in aviation ready-rooms, aircraft operations control centers aboard ships, and in the cockpits of tactical aircraft.)

5) Red-orange overhead street lighting has become commonplace in the form of high pressure sodium and other discharge lamps, due to their high efficiency and reliability. They further are suspected to give superior nighttime vision assistance (as compared with blue-white lamps) to the aging populace of drivers because of the blue-scattering and attenuating characteristics of the corneas, lenses, and vitreous constituents of the aged eye. The illumination from these overhead lamps, by virtue of its point of issue and its distribution onto the roadway, contribute to visibility without contributing to glare (they illuminate the roadway, surroundings, and vehicles without shining a piercing beam in the manner of a horizontally mounted headlamp). Unfortunately, however, mirrors which are either permanently or temporarily violet, blue or blue green are so by virtue of their attenuation of red and orange light. Therefore, in the case of the ever more popular high pressure sodium and other overhead street lamps with reddish-orange hue, the bluish mirrors actually attenuate the light which is most optimum for visibility without glare.

In summary, then, prior art mirrors with temporary or permanent blue hue actually amplify glare and reduce visibility in a number of highway environs which are becoming universal. The prior art electro-optic assemblies also suffer the drawback of, practically speaking, preventing combinations using red-orange displays. Because they absorb/ attenuate red-orange light preferentially (a characteristic which causes them to look bluish in color) a red orange display positioned behind such an electro-optic media will not readily shine therethrough.

By adopting an electro-optic media which has enhanced red-orange light response and by further combining this with displays or other instruments whose response matches the electro-optic media of this invention, the discussed disadvantages of the prior art are overcome.

An object of the present invention is to overcome disadvantages in prior electro-optic mirrors of the indicated character and to provide an improved electro-optic mirror incorporating improved glare-reducing properties.

Another object of the present invention is to provide an improved electro-optic mirror having glare-reducing properties which are superior to the glare-reducing properties of prior mirrors of the indicated character.

Another object of the present invention is to provide an improved electro-optic mirror incorporating improved display means providing high efficiency in the transmission of light whereby the brightness of the display means is increased.

Another object of the present invention is to provide an improved electrochromic rearview mirror in which the color of the mirror in the partial reflectance mode is correlated with the color of display means embodied in the mirror.

Another object of the present invention is to provide an improved electrochromic rearview mirror wherein the electrochromic medium in a darkened state has an enhanced transmittance of visible light in the generally orange, red and near infrared wavelengths above 585 nanometers and is combined with a display which shines through the electrochromic medium, the peak emission of the display substantially corresponding with the aforementioned enhanced transmittance of the electrochromic medium.

Still another object of the present invention is to provide an improved electrochromic rearview mirror which is economical to manufacture and assembly, durable, efficient and reliable in operation.

The above as well as other objects and advantages of the present invention will become apparent from the following description and the accompanying drawings.

BRIEF DESCRIPTION OF THE DRAWINGS

FIG. 1 is a perspective view of an inside electrochromic rearview mirror embodying the present invention and shown installed on the windshield of a vehicle, together with two outside electrochromic rearview mirrors embodying the present invention and shown installed on the outside of the vehicle in a conventional manner whereby each of the mirrors faces rearwardly of the vehicle in a conventional manner;

FIG. 2 is a front elevational view of the inside electrochromic mirror illustrated in FIG. 1, showing the same removed from the mirror housing;

FIG. 3 is a schematic cross sectional view of the mirror illustrated in FIG. 2, taken on the line 3—3 thereof;

FIG. 5 is a chart depicting the one-way spectral transmittance of the preferred electrochromic cell in its uncolored and colored states;

FIG. 6 is a chart depicting the spectral reflectance of the preferred electrochromic mirror in its clear, darkened and intermediate states;

FIG. 7 is a chart depicting the CIE color matching functions used for colorimetry, i.e. measurement of color;

FIG. 8 is a representation of the CIE 1976 UCS chromaticity chart;

FIG. 9 is a chart of the saturation of monochromatic sources having equal luminance;

FIG. 11 is a chart depicting the superior attenuation of harsh headlamp glare by the improved electrochromic mirror embodying the present invention;

FIG. 12 is a chart depicting the benefits of the improved electrochromic mirror embodying the present invention in combination with a display having an emission spectra substantially matched to a generally orange or red band of light which is preferentially transmitted by the electrochromic medium even when the electrochromic medium is in its darkened state;

DETAILED DESCRIPTION

Figure 4:
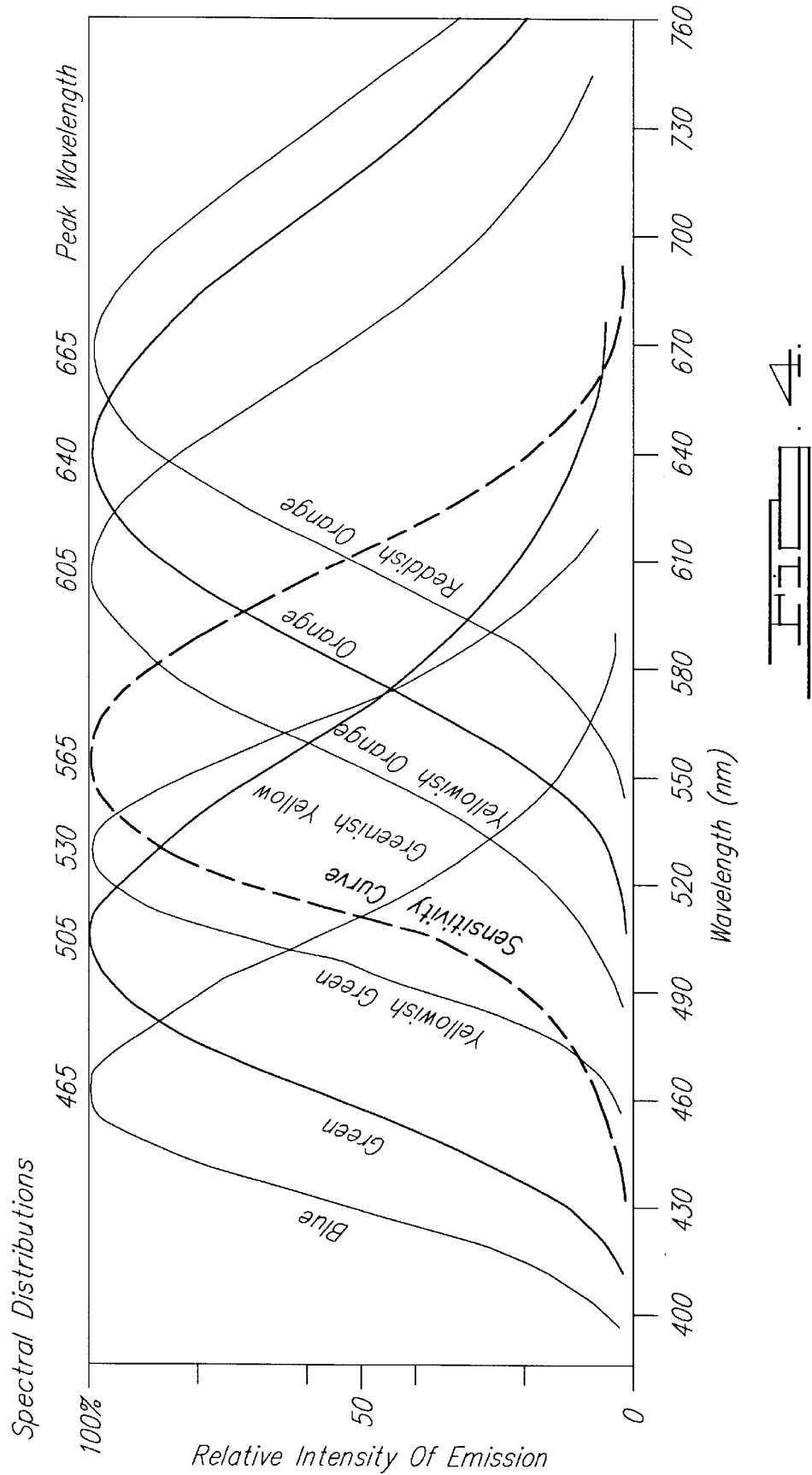
FIG. 4 is a chart representing the spectral distribution of the visible light emitted by the display incorporated in a mirror embodying the present invention.

The present invention is particularly adapted for use with electrochromic mirrors of the general type disclosed in U.S. Pat. No. 4,902,108, issued Feb. 20, 1990, for Single-Compartment, Self-Erasing, Solution-Phase Electrochromic Devices, Solutions for Use Therein, and Uses Thereof, and U.S. Pat. No. 4,917,477, issued Apr. 17, 1990, for Automatic Rearview Mirror System for Automotive Vehicles, both of which are assigned to the assignee of the present invention, and the disclosures of each of which are hereby incorporated herein by reference. Mirrors embodying the present invention may be utilized in fully integrated inside/outside rearview mirror systems or in an inside or an outside rearview mirror system. Such electrochromic mirrors dim and clear under the control of electronic circuitry whereby such electronic control mirrors may be utilized in conjunction with other visually related equipment in automotive vehicles. In automatic rearview mirrors of the general types disclosed in the aforementioned United States patents, the mirrors are comprised of a thin chemical layer sandwiched between two glass elements. As the chemical layer is electrically energized, it darkens and begins to absorb light, and the higher the voltage the darker the mirror becomes. When the electrical voltage is removed, the mirror returns to its clear state. With such electrochromic mirrors, light sensing circuitry is effective to switch the mirrors to the nighttime mode when glare from the rear of the vehicle is detected, the sandwiched chemical layer being activated when glare is detected thereby darkening the mirror automatically. As the glare subsides, the mirror automatically returns to its former generally clear state without any action being required on the part of the driver of a vehicle. The amount of dimming depends upon how much glare the driver experiences, and with only a little glare, the mirror dims only partially while with bright blinding glare, the mirror dims to a fully dark condition. Heretofore, in commercially available electrochromic mirrors of the indicated character, in most instances, the electrochromic solution initially appeared colorless, and changed to a deep blue-purple or deep blue-green color when voltage was applied to the solution, and the solution returned to its bleached, colorless state when the voltage applied to the solution was open-circuited or short-circuited. In other electro-optic prior art, the electro-optic material turned pink in the darkened condition, and in other electro-optic prior art mediums, in their zero-potential, equilibrium states, the electro-optic mediums were tinted yellow or blue. As previously discussed, it is advantageous to have an electrochromic medium in such a mirror which exhibits an orange hue rather than a blue one.

It has long been known that orange colored displays preserve night vision better than blue, violet or blue green ones. However, it has not previously been feasible to utilize an orange display in combination with an electrochromic mirror because the electrochromic mirrors have preferentially absorbed orange light, thus dramatically limiting the visibility of a desired orange display, and there is no suggestion in the prior art of combining an orange electrochromic medium with an orange display in an electro-optic rearview mirror. Accordingly, while prior art electro-optic mirrors usually turn a shade of blue or even pink in the darkened condition, the present invention provides an electrochromic medium which in the darkened state has an average transmittance of visible light in the generally orange, red and near infrared wavelengths above 585 nanometers which is greater than the average transmittance of visible light in the generally blue and green wavelengths below 585 nanometers whereby the glare-reducing properties are superior to any known prior art electro-optic rearview mirrors. Moreover, in accordance with the present invention, the above described electrochromic medium may be combined with a display which shines through the electrochromic medium, the peak emission band of the display substantially corresponding with the high transmittance band of the electrochromic medium. By way of example, the display is preferably a standard Futaba Corporation vacuum fluorescent display having the color orange with a peak emission of 605 nanometers. Also, by way of example, in accordance with the present invention, the electrochromic means is a single-compartment, self-erasing, solution-phase electrochromic device which comprises, as the medium of reversibly variable transmittance to light, solutions of the type described in Example III of U.S. Pat. No. 4,902,108 with the exception that the cathodic electrochromic compound 1,1'-di(n-heptyl)-4,4'-bipyridinium difluoroborate has been replaced with 2-Ethylanthraquinone whereby in a darkened state the electrochromic medium has an average one-way transmittance in the generally orange and red bands between wavelengths of 585 nanometers and 780 nanometers which is substantially greater than its average one-way transmittance in the generally blue and green bands between the wavelengths of 380 and 585 nanometers. Furthermore, this improved construction exhibits enhanced near infrared light transmission (such that its average one-way transmittance between 780 and 900 nanometers is also substantially higher than its one-way transmittance for the generally blue and green bands between the wavelengths of 380 and 585 nanometers). Other cathodic electrochromic compounds such as 1,1'-dimethyl-2,4'-bipyridinium difluoroborate may also be used as substitutes for the 2-Ethylanthraquinone in this preferred embodiment. Furthermore the benefits taught herein may be obtained through the use of other electro-optic media such as solid phase electrochromic compounds, hybrid solid and solution phase electrochromic combinations, color dichroic liquid crystal compounds, etc.

As previously mentioned, in accordance with the present invention, a vacuum fluorescent display may be embodied in the automatic rearview mirror whereby information, such as outside temperature and/or compass information may be displayed to the driver of the vehicle, the normal location of the rearview mirror allowing easy viewing of the display to the driver of the vehicle. Prior displays of the indicated character are disclosed in the co-pending U.S. application of Robert C. Knapp, Ser. No. 07/840,852 for Automatic Electrochromic Control of Light Level of Vacuum Fluorescent Display, which application is also assigned to the assignee of the present invention, and the entire disclosure of which is hereby incorporated herein by reference.

Alternatively, the display may be of any type having the proper spectral emission properties as taught herein, such as an orange LED (light emitting diode), a CRT, plasma or the like. Furthermore, in another embodiment the display may be replaced or supplemented by an instrument which is an emitter or receiver whose infrared response properties are substantially matched to the preferential transmittance properties of the improved electrochromic medium.

Referring to FIGS. 1, 2 and 3, the present invention is illustrated as embodied in an automatic rearview mirror system, generally designated 10, which is particularly adapted for use in connection with automotive vehicles, although it will be understood that the present invention is applicable to other uses. Automatic rearview mirror systems embodying the present invention include an inside rearview mirror 11 which is shown in FIG. 1 installed on the windshield 13 of a vehicle. The system 10 may also include outside electrochromic rearview mirrors 15 and 17 which may be installed on the outside of a vehicle in a conventional manner whereby each of the mirrors 11, 15 and 17 faces rearwardly of the vehicle in a conventional manner; it being understood that any desired combination of inside and/or outside mirrors may be utilized. The system 10 includes circuitry (not shown) for automatically controlling the reflectance of the mirrors 11, 15 and 17 to provide maximum rear vision and at the same time providing relief to the driver of the vehicle from glare which may be caused by headlights from a following vehicle during nighttime driving. The ambient and glare-causing light levels observed by the driver of the vehicle are monitored by a pair of photo sensors (not shown) facing generally forwardly and generally rearwardly, respectively, of the vehicle, and the electronic circuitry provided within the mirror assembly processes the light level information and functions to properly energize the electrochromic material when glare relief is required.

The mirrors 11, 15 and 17 each include a reflective layer 12 which may, for example, be provided on a rear surface of a rear glass layer 14, and a front glass 16 is provided in front of the rear glass layer 14. An electrochromic layer 18 embodying the present invention is disposed between the front and rear glass layers and confined by a seal 15, the electrochromic layer 18 including ingredients having the desired electrochromic properties whereby the electrochromic layer, in the darkened state, has an average transmittance of visible light occurring in the generally orange, red and near infrared wavelengths above 585 nanometers which is greater than the average transmittance of visible light in the generally blue and green wavelengths below 585 nanometers. Transparent conductive layers 20 and 22 are also provided which are electrically connected to the circuitry controlling the darkening and lightening of the electrochromic mirror, the transparent conductive layers being described in detail in the aforementioned U.S. Pat. Nos. 4,902,108 and 4,917,477.

A surface area 24 of the reflective layer 12 of the mirror is removed so that no reflective capability exists in such surface area. An information display module 26 having information such as outside temperature and/or compass direction displayed on its front face is oriented so that the front face of the information module abuts against the adjacent surface of the rear glass 14 so that information carried by the display module 26 is visible to the vehicle operator through the rear glass layer 14, the electrochromic layer 18, the transparent conductive layers 20 and 22, and the front glass 16. The emission band of the display module preferably substantially corresponds with the transmittance band of the electrochromic medium, i.e. in the generally orange, red and near infrared bands having wavelengths above 585 nanometers. As previously mentioned, mirrors reflecting light in the orange and red bands as embodied by the present invention have superior glare-reducing properties. At the same time, the orange display 26 provides superior nighttime vision, as compared to more common blue-green displays of the prior art. Moreover, the present invention provides high efficiency in transmission of orange and red light from the display whereby the display brightness can be several times higher than it would be if prior art electrochromic devices (which turn a shade of blue in the darkened state), were used and consequently the present invention provides an improvement in display efficiency.

In support of the foregoing description, FIG. 4 illustrates the spectral distribution of the visible light emitted by the display, while FIG. 5 depicts the one-way spectral transmittance of the preferred electrochromic medium in its uncolored and colored states. FIG. 6 depicts the spectral reflectance of the preferred electrochromic medium in its clear, darkened and intermediate states while FIG. 7 depicts the CIE color-matching functions used for measurement of color.

Figure 10:
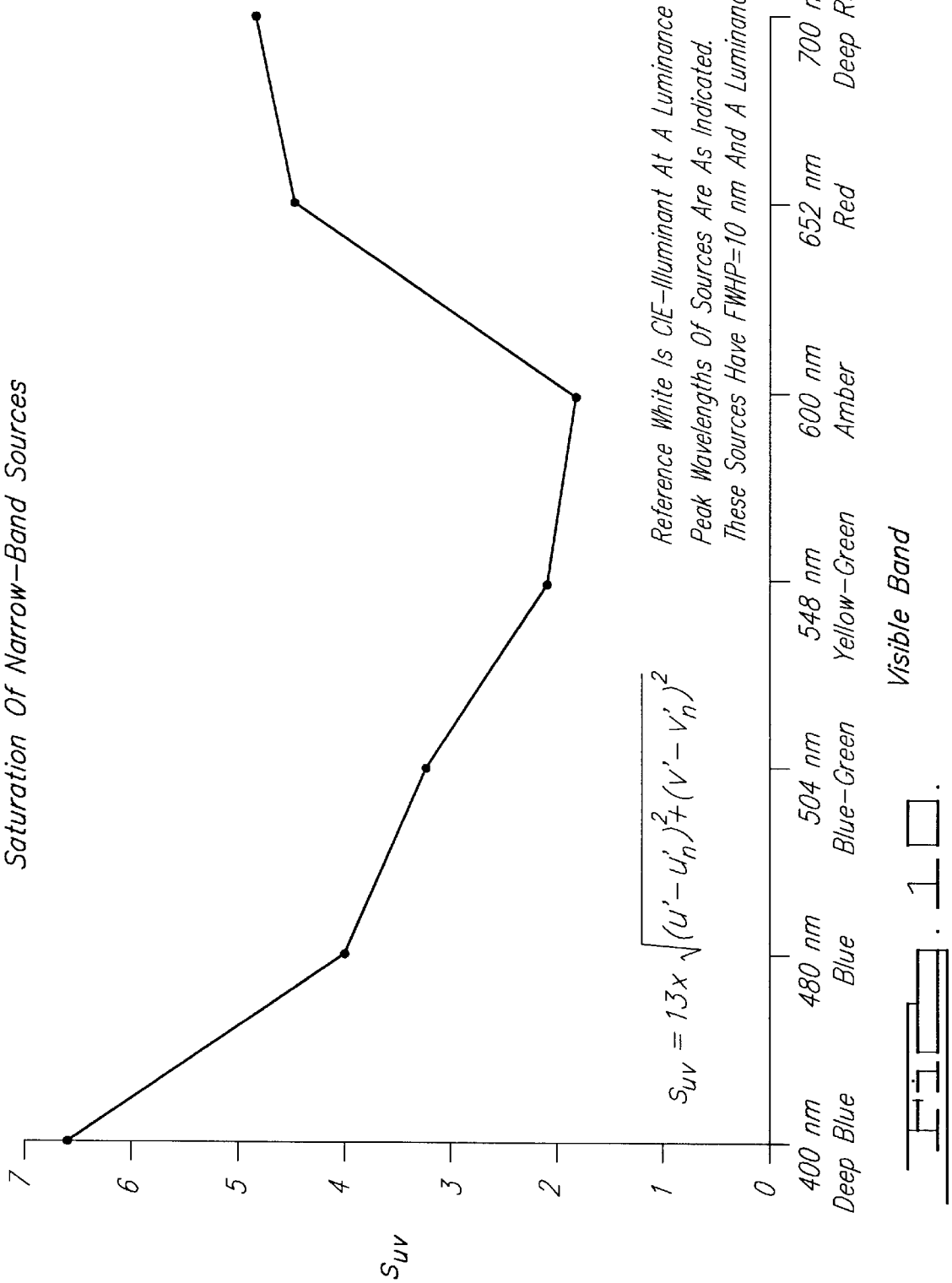
FIG. 10 is a chart of saturation of narrow-band sources having equal luminance.

FIG. 8 is a representation of the CIE 1976 UCS chromaticity chart, while FIG. 9 depicts that saturation of monochromatic sources having equal luminance and FIG. 10 depicts the saturation of narrow-band sources having equal luminance.

FIG. 11 is a chart depicting the superior attenuation of harsh headlamp glare by the improved electrochromic mirror embodying the present invention.

Figure 13:
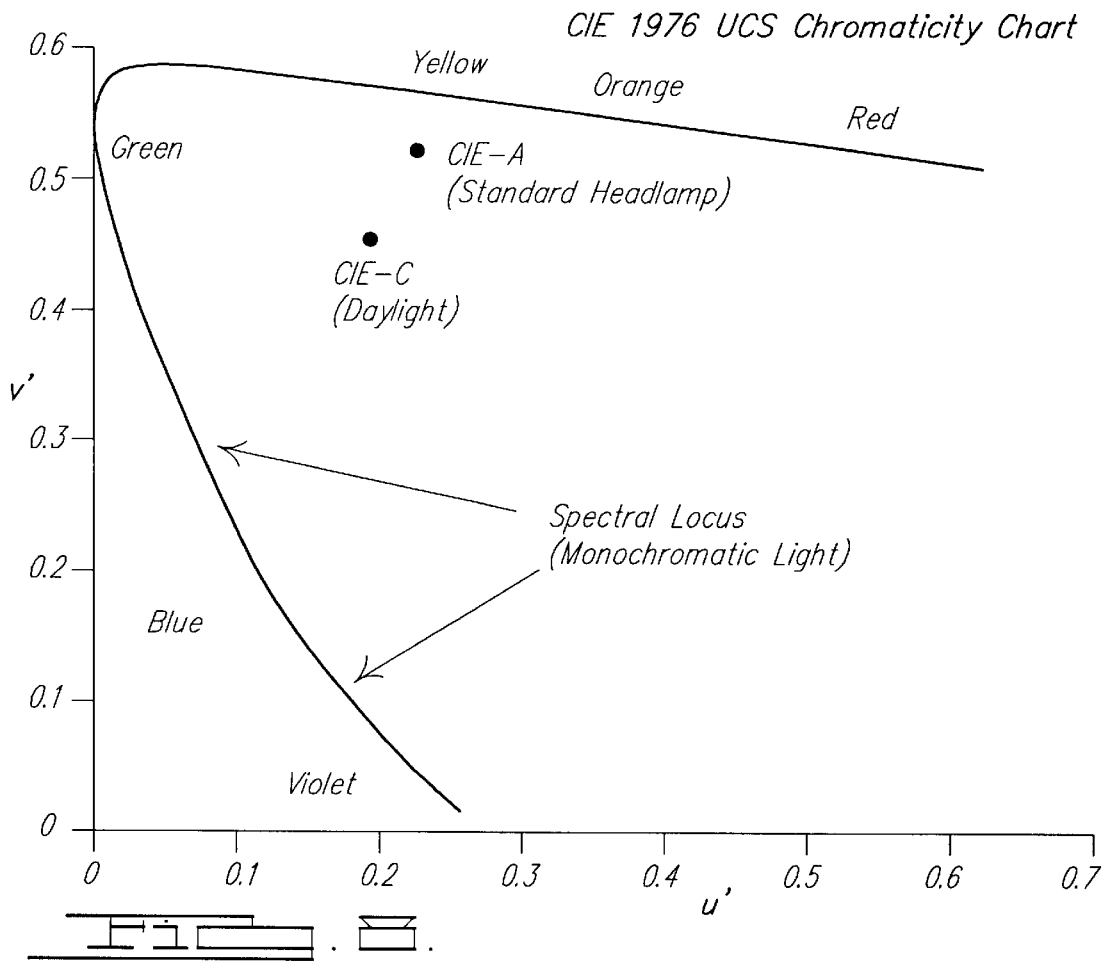
FIG. 13 is a chart showing the benefits of the improved electrochromic mirror embodying the present invention in combination with an instrument (emitter or detector) whose response (emission or reception) is substantially matched to a band of infrared light which is preferentially transmitted by the electrochromic medium, even when the electrochromic medium is in its darkened state.
Figure 14:
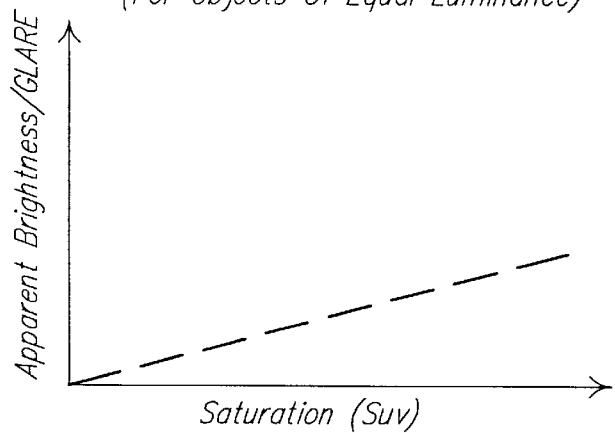
FIG. 14 is a chart showing the relationship between saturation and glare.

FIG. 12 depicts the benefits of the improved electrochromic mirror embodying the present invention in combination with a display having an emission spectra substantially matched to a generally orange or red band of light which is preferentially transmitted by the electrochromic medium even when the electrochromic medium is in its darkened state; FIG. 13 shows the benefits of the improved electrochromic mirror embodying the present invention in combination with an instrument (emitter or detector) whose response (emission or reception) is substantially matched to a band of infrared light which is preferentially transmitted by the electrochromic medium, even when the electrochromic medium is in its darkened state; and FIG. 14 shows the relationship between saturation and glare.

In order to achieve the benefits of the improved electrochromic mirror as disclosed herein on a full time basis, not only when the mirror is dark but also in the clear state, it will be understood, if desired, mirrors of the type illustrated and described in the aforementioned U.S. Patents incorporated herein by reference may be utilized in conjunction with an orange, red and/or near infrared filter in the form of a coating, film, additive or other means and having the aforementioned transmittance and/or reflective properties applied to any of the surfaces of the front and rear glass elements, or incorporated in the glass itself or incorporated in the electrochromic medium.

The present invention has been illustrated and described in connection with electrochromic media but it will be understood that the present invention may be embodied in mirror systems utilizing other types of electro-optic media.

While preferred embodiments of the invention have been illustrated and described, it will be understood that various changes and modifications may be made without departing from the spirit of the invention.

What is claimed is:

1. An electro-optically dimming rearview mirror for motor vehicles, said mirror comprising, in combination, front and rear spaced elements, said front element and said rear element defining a chamber therebetween, said front element being transparent, the side of such front element confronting said rear element including transparent electrically conductive means, the side of said rear element confronting said front element including means providing electrically conductive functions, said chamber containing an electro-optic reversibly variable transmittance medium in contact with said transparent electrically conductive means on said front element and said means providing electrically conductive functions on said rear element, means providing light reflective functions on said rear element effective to reflect light through said medium and through said front element when said light reaches said means providing light reflective functions after passing through said medium and through said front element, said electro-optic reversibly variable transmittance medium in a darkened state being effective to transmit visible light in the orange, red and near infrared wavelengths above 585 nanometers and to simultaneously partially absorb visible light in the blue and green wavelengths below 585 nanometers whereby the average transmittance of light in the orange, red and near infrared wavelengths above 585 nanometers is greater than the average transmittance of light in the blue and green wavelengths below 585 nanometers, and means for applying electrical potential to said electro-optic medium to cause variations in the light transmittance of said electro-optic medium.

2. The combination as set forth in claim 1, including display means effective to emit light through said electro-optic medium, the peak emission of said display means substantially corresponding with the transmittance of light of said electro-optic medium in the orange, red and near infrared wavelengths above 585 nanometers.

3. The combination as set forth in claim 1, wherein said rearview mirror is an inside mirror on a vehicle.

4. The combination as set forth in claim 1 wherein said rearview mirror is an outside mirror on a vehicle.

5. The combination as set forth in claim 2 wherein said rearview mirror is an inside mirror on a vehicle.

6. The combination as set forth in claim 2 wherein said rearview mirror is an outside mirror on a vehicle.

7. An electro-optically dimming rearview mirror for motor vehicles, said mirror comprising, in combination, front and rear spaced elements, said front element and said rear element defining a chamber therebetween, said front element being transparent, the side of said front element confronting said rear element including transparent electrically conductive means, the side of said rear element confronting said front element including electrically conductive means, said chamber containing an electro-optic reversibly variable transmittance medium in contact with said transparent electrically conductive means on said front element and said electrically conductive means on said rear element, said rear element including light reflective means effective to reflect light through said medium and through said front element when said light reaches said light reflective means after passing through said medium and through said front element, said electro-optic medium in the darkened state having an average transmittance of visible light in the orange, red and near infrared wavelengths above 585 nanometers which is greater than the average transmittance of visible light in the blue and green wavelengths below 585 nanometers, and means for applying electrical potential to said electro-optic medium to cause variations in the light transmittance of said electro-optic medium.

8. The combination as set forth in claim 7 wherein said electro-optic medium is an electrochromic medium.

9. The combination as set forth in claim 8 wherein said electrochromic medium includes 2-Ethylanthraquinone whereby in a darkened state the electrochromic medium has an average one-way transmittance in the orange and red bands between wavelengths of 585 nanometers and 780 nanometers which is substantially greater than its average one-way transmittance in the blue and green bands between the wavelengths of 380 and 585 nanometers.

10. The combination as set forth in claim 8 wherein said electrochromic medium includes 1,1'-dimethyl-2,4'-bipyridinium difluoroborate.

11. In a rearview mirror for automotive vehicles, the combination including a reflectance member effective to reflect visible light impinging thereon, a filter effective to transmit light to and reflected by said reflectance member, said reflectance member in conjunction with said filter having an average reflectance of visible light in the orange, red and near infrared wavelengths above 585 nanometers which is greater than the average reflectance of visible light in the blue and green wavelengths below 585 nanometers.

12. The combination as set forth in claim 11, said filter being in the form of a film applied to said reflectance member.

13. The combination as set forth in claim 11, said filter being in the form of a coating applied to said reflectance member.

14. The combination as set forth in claim 11, said reflectance member including a glass element, said filter being in the form of an additive incorporated in the glass itself.

15. The combination as set forth in claim 11, said rearview mirror including an electro-optic medium, said filter being incorporated in said electro-optic medium.

16. The combination as set forth in claim 11, said rearview mirror including an electrochromic medium, said filter being incorporated in said electrochromic medium.

17. An electro-optically dimming rearview mirror for motor vehicles, said mirror comprising, in combination, front and rear spaced elements, said front element and said rear element defining a chamber therebetween, said front element being transparent, the side of said front element confronting said rear element including transparent electrically conductive means, the side of said rear element confronting said front element including electrically conductive means, said chamber containing an electrochromic reversibly variable transmittance medium in contact with said transparent electrically conductive means on said front element and said electrically conductive means on said rear element, said rear element including light reflective means effective to reflect light through said medium and through said front element when said light reaches said light reflective means after passing through said medium and through said front element, said electrochromic medium in the darkened state having an average one-way transmittance of visible light in the wavelengths between 780 and 900 nanometers which is higher than the average one-way transmittance of visible light in the wavelengths between 380 and 585 nanometers, and means for applying electrical potential to said electrochromic medium to cause variations in the light transmittance of said electro-optic medium.

18. The combination as set forth in claim 17 including display means effective to emit light through said electrochromic medium, the peak emission of said display means substantially corresponding with the average one-way transmittance of visible light of said electrochromic medium in the wavelengths between 780 and 900 nanometers.

* * * * *